US010663055B2

(12) United States Patent
Nakamura et al.

(10) Patent No.: US 10,663,055 B2
(45) Date of Patent: May 26, 2020

(54) DIFFERENTIAL GEAR DEVICE

(71) Applicant: TOYOTA JIDOSHA KABUSHIKI KAISHA, Toyota-shi, Aichi (JP)

(72) Inventors: Shingo Nakamura, Toyota (JP); Tetsuo Hori, Toyota (JP); Yutaka Ueno, Togo-cho (JP); Yutaro Oguma, Toyota (JP); Takumi Samejima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 16/211,340

(22) Filed: Dec. 6, 2018

(65) Prior Publication Data

US 2019/0170241 A1 Jun. 6, 2019

(30) Foreign Application Priority Data

Dec. 6, 2017 (JP) ................................. 2017-234713

(51) Int. Cl.
*F16H 57/04* (2010.01)
*F16H 48/08* (2006.01)
*F16H 48/40* (2012.01)
*F16H 48/38* (2012.01)

(52) U.S. Cl.
CPC ......... *F16H 57/0427* (2013.01); *F16H 48/08* (2013.01); *F16H 48/40* (2013.01); *F16H 57/0457* (2013.01); *F16H 57/0483* (2013.01); *F16H 2048/387* (2013.01)

(58) Field of Classification Search
None
See application file for complete search history.

(56) References Cited

U.S. PATENT DOCUMENTS

| 3,490,312 A | * | 1/1970 | Dehart | ................... F16H 48/22 |
| | | | | 475/88 |
| 5,007,885 A | * | 4/1991 | Yamamoto | ........... B60K 17/351 |
| | | | | 192/103 F |
| 10,309,521 B2 | * | 6/2019 | Takuno | ................ B60K 17/344 |

FOREIGN PATENT DOCUMENTS

| JP | H07-305757 A | 11/1995 |
| JP | 2014-190528 A | 10/2014 |
| JP | 2017-116035 A | 6/2017 |

* cited by examiner

*Primary Examiner* — Dirk Wright
(74) *Attorney, Agent, or Firm* — Oliff PLC (57) ABSTRACT

A differential gear device including: a differential casing; and a pair of side gears which are disposed within the differential casing such that the side gears are rotatable about the above-indicated axis and are axially opposed to each other, and such that a rotary motion of the differential casing about the above-indicated axis is transmitted to the side gears through at least one pinion gear, the differential casing having a pair of bearing portions which extend from its respective inner surfaces toward back surfaces of the respective side gears, which are coaxial with said axis and which have respective annular seating surfaces which receive axial loads from the side gears, and wherein each of the pair of bearing portions has a protrusion extending from an outer circumference of corresponding one of the annular seating surfaces in a radially outward direction of the annular seating surface.

6 Claims, 6 Drawing Sheets

DIFFERENTIAL GEAR DEVICE

This application claims priority from Japanese Patent Application No. 2017-234713 filed on Dec. 6, 2017, the disclosure of which is herein incorporated by reference in its entirety.

FIELD OF THE INVENTION

The present invention relates to a differential gear device including a differential casing and a pair of side gears, and more particularly to lubrication between seating surfaces of the differential casing and the side gears.

BACKGROUND OF THE INVENTION

There is known a differential gear device including: (a) a differential casing rotatable about an axis; and (b) a pair of side gears which are disposed within the differential casing such that the side gears are rotatable about the above-indicated axis, such that the side gears are opposed to each other, and such that a rotary motion of the differential casing about the above-indicated axis is transmitted to the side gears through pinion gears, so as to permit differential rotary motions of the side gears. The differential casing has a pair of bearing portions which extend from its respective inner surfaces toward back surfaces of the respective side gears and which have respective annular seating surfaces which are coaxial with the respective side gears and which receive axial loads from the side gears. JP-2017-116035A discloses an example of such a differential gear device. In the differential gear device disclosed in this publication, a lubricant oil in the differential casing is splashed up by the side gears, and a differential ring gear attached to the differential casing, to lubricate various parts of the differential gear device. Further, annular seating surfaces of the differential casing, which are provided for the respective side gears, have lubricant grooves formed so as to extend from their inner edges to their outer edges, while back surfaces of the side gears have lubricant scattering preventive portions at their outer edges, to hold the lubricant oil between the seating surfaces and the back surfaces of the side gears, for lubricating washers interposed therebetween, for instance. In addition, inner circumferential surfaces of bores which are formed through the differential casing and through which rotary shafts connected to the side gears extend have spiral grooves through which the lubricant oil outside the differential casing is introduced into the differential casing and directed in between the seating surfaces and the back surfaces of the side gears.

However, the differential gear device constructed as described above has a problem of a low resistance to seizure due to shortage of an amount of the lubricant oil supplied in between the back surfaces of the side gears and the seating surfaces when the differential gear device is placed in a differential state in which one of the two side gears is held stationary and does not function to splash up the lubricant oil within the differential casing. This problem is serious particularly where a level of the lubricant oil within the differential casing is lowered to reduce a power loss due to the splashing of the lubricant oil. The problem is also serious where the lubricant oil has a low temperature, and has a high degree of viscosity and an accordingly low degree of fluidity at a low temperature of the lubricant oil.

SUMMARY OF THE INVENTION

The present invention was made in view of the background art described above. It is therefore an object of the present invention to provide a differential gear device which permits sufficient lubrication between the back surfaces of the side gears and the seating surfaces of the differential casing, even in the differential state in which one of the two side gears is held stationary.

The object indicated above is achieved according to the following modes of the present invention:

According to a first mode of the invention, there is provided a differential gear device comprising: a differential casing rotatable about an axis; and a pair of side gears which are disposed within the differential casing such that the side gears are rotatable about the above-indicated axis and axially opposed to each other, and such that a rotary motion of the differential casing about the above-indicated axis is transmitted to the side gears through at least one pinion gear, so as to permit differential rotary motions of the side gears, the differential casing having a pair of bearing portions which extend from its respective inner surfaces toward back surfaces of the respective side gears, which are coaxial with said axis and which have respective annular seating surfaces which receive axial loads from the side gears, and wherein each of the pair of bearing portions has at least one protrusion extending from an outer circumference of corresponding one of the annular seating surfaces in a radially outward direction of the annular seating surface.

According to a second mode of the invention, the differential gear device according to the first mode of the invention is configured such that each of the annular seating surfaces of the bearing portions has at least one lubricant groove formed so as to extend from its outer circumference toward its inner circumference such that an outer end of each of the at least one lubricant groove is located adjacent to a corresponding one of the at least one protrusion and on a downstream side of the protrusion as seen in a primary direction of rotation (i.e. advancing side) of the differential casing about the above-indicated axis. The primary direction is a direction of rotation of the differential casing when the differential casing is rotated only in one direction about an axis. The primary direction is appropriately defined based on such as times or/and frequencies for each directions of rotation of the differential casing, when the differential casing can be rotated in both of forward and reverse rotational directions. Practically, for a vehicular differential device configured to distribute drive power to right and left driving wheels wherein the vehicle runs both of forward and reverse directions, usually the primary direction is defined as a direction corresponding to forward running.

According to a third mode of the invention, the differential gear device according to the second mode of the invention is configured such that each of the at least one lubricant groove is formed along a straight line which is inclined with respect to a straight line parallel to a radial direction of the corresponding annular seating surface having its center on the above-indicated axis.

According to a fourth mode of the invention, the differential gear device according to any one of the first, second and third modes of the invention is configured such that the at least one protrusion consists of a plurality of protrusions which are spaced apart from each other in a circumferential direction of the corresponding annular seating surface having its center on the above-indicated axis.

According to a fifth mode of the invention, the differential gear device according to any one of the first through fourth modes of the invention is configured such that a washer and a coned-disc spring are interposed between the back surface of each of the pair of side gears and the annular seating surface of a corresponding one of the pair of bearing portions.

According to a sixth mode of the invention, the differential gear device according to any one of the first through fifth modes of the invention is disposed such that the above-indicated axis extends in a substantially horizontal direction and such that the at least one protrusion is immersed in a lubricant oil accommodated within the differential casing, to permit the at least one protrusion to splash up the lubricant oil during the rotary motion of the differential casing.

In the differential gear device according to the first mode of the invention wherein each of the pair of bearing portions of the differential casing has the at least one protrusion extending from the outer circumference of the corresponding annular seating surface in the radially outward direction of the annular seating surface, a lubricant oil within the differential casing is effectively splashed up by the protrusions of the bearing portions and supplied in between the seating surfaces and the back surfaces of the side gears, even in an early stage of a rotary motion of the differential casing. Accordingly, the present differential gear device permits effective splashing of the lubricant oil by the at least one protrusion during rotation of the differential casing, and sufficient lubrication between the back surface of the side gear and the seating surface of the differential casing, even on the side of the side gear which is held stationary in the differential state of the differential gear device. Since the lubricant oil is splashed up by the protrusions provided on the bearing portions, the lubricant oil can be efficiently supplied to and around the seating surfaces, so that a power loss due to the splashing of the lubricant oil can be minimized, while at the same time a sufficient amount of the lubricant oil can be supplied even where the lubricant oil has a low temperature, and a high degree of viscosity and an accordingly low degree of fluidity. Further, the power loss due to the splashing of the lubricant oil by the differential ring gear and the other components of the differential gear device can be reduced by lowering the level of the lubricant oil within the differential casing, to an extent which permits the protrusions of the bearing portions to be immersed in the lubricant oil.

In the differential gear device according to the second mode of the invention, the annular seating surface of each bearing portion has at least one lubricant groove formed so as to extend from its outer circumference toward its inner circumference, such that the outer end of the lubricant groove is located adjacent to the corresponding protrusion and on the downstream side of the protrusion as seen in the primary direction of rotation of the differential casing about the above-indicated axis. Accordingly, flows of the lubricant oil are stopped by the protrusions and are easily introduced into the lubricant grooves, so that the lubricant oil is efficiently supplied in between the seating surfaces and the back surfaces of the side gears.

In the differential gear device according to the third mode of the invention wherein each lubricant groove is formed along the straight line inclined with respect to the straight line parallel to the radial direction of the corresponding annular seating surface, the lubricant oil introduced radially inwardly of the annular seating surface is brought into contact with a wall surface of each lubricant groove while the inwardly introduced lubricant oil is subjected to a centrifugal force which causes the lubricant oil to be scattered radially outwardly of the annular seating surface, whereby the radially outward scattering of the lubricant oil is suppressed to permit adequate lubrication of the back surface of the side gear and the annular seating surface.

In the differential gear device according to the fourth mode of the invention wherein the plurality of protrusions are spaced apart from each other in the circumferential direction of the corresponding annular seating surface having its center on the above-indicated axis, the lubricant oil can be efficiently splashed up by the protrusions and supplied in between the corresponding annular seating surface and the back surface of the corresponding side gear.

In the differential gear device according to the fifth mode of the invention wherein the washer and the coned-disc spring are interposed between the back surface of each side gear and the annular seating surface of the corresponding bearing portion, components of the differential gear device have a comparatively large total surface area that should be lubricated with the lubricant oil, so that a comparatively large amount of the lubricant oil is required to be supplied to the components. However, the required amount of the lubricant oil can be supplied to the components, by suitably determining the number, distance of extension and shape of the protrusions.

The differential gear device according to the sixth mode of the invention is disposed such that the above-indicated axis extends in the substantially horizontal direction and such that the at least one protrusion is immersed in the lubricant oil accommodated within the differential casing, to permit the at least one protrusion to splash up the lubricant oil during the rotary motion of the differential casing. Accordingly, the differential gear device can stably enjoy the above-described advantages owing to the provision of the at least one protrusion on each of the bearing portions of the differential casing according to the principle of the present invention.

DETAILED DESCRIPTION OF PREFERRED EMBODIMENTS

The differential gear device according to the present invention is suitably used for a vehicle provided with a transaxle wherein the differential gear device is accommodated within a transaxle casing structure, together with a transmission device configured to transmit a vehicle drive force to the differential gear device. However, the differential gear device of the invention may be used for any other type of vehicular power transmitting system, or for any power transmitting system other than the vehicular power transmitting system. The differential gear device includes a differential casing a rotary motion of which is transmitted to a pair of side gears through at least one pinion gear. Although the differential gear device may include one pinion gear, it is preferable that the differential gear device includes a plurality of pinion gears. The side gears and the at least one pinion gear are bevel gears. The differential casing is provided with a differential ring gear as an input gear in the form of a bevel gear, a hypoid gear or cylindrical gear. The differential ring gear is formed integrally with or fixed to the differential casing. However, the rotary motion is transmitted to the differential casing through any other rotary motion transmitting means. The differential casing may be a one-piece cast structure, or consist of a plurality of parts which are assembled together.

The pair of bearing portions are formed integrally with the differential casing or fixed to the inner surfaces of the differential casing. Each of the bearing portions may be a cylindrical portion having a constant diameter, or a tapered portion (truncated conical portion) the outside diameter of which increases in a direction from its annular seating surface toward its proximal end. The at least one protrusion extending radially outwardly of the outer circumference of the annular seating surface of each bearing portion consists of only one protrusion, or a plurality of protrusions which are equiangularly spaced apart from each other in the circumferential direction of the annular seating surface. For example, each protrusion is formed so as to extend in parallel to the above-indicated axis. However, the protrusion may be twisted or inclined about the axis. Each bearing portion may have an equilateral or other polygonal outer profile with its center on the axis. In this case, the bearing portion has a plurality of protrusions at or adjacent to the apex portions of the polygonal outer profile. Each protrusion may be formed so as to extend in the direction of the above-indicated axis from the inner surface of the differential casing to a position of the annular seating surface of the bearing portion, or to a position between the annular seating surface and the back surface of the corresponding side gear, or to a position between the annular seating surface and the inner surface of the differential casing.

The annular seating surface of each bearing portion preferably has at least one lubricant groove formed such that an outer end of each of the at least one lubricant groove is located adjacent to a corresponding one of the at least one protrusion and on a downstream side of the protrusion as seen in a primary direction of rotation of the differential casing about the above-indicated axis. However, the annular seating surface need not have the at least one lubricant groove. Further, the at least one lubricant groove may be formed so as to be located regardless of the circumferential position of the corresponding protrusion. For example, each of the at least one lubricant groove is formed so as to extend between the inner and outer circumferences of the annular seating surface. However, the lubricant groove may be formed such that its inner end is located between the outer and inner circumferences of the annular seating surface. For example, each lubricant groove is formed so as to extend from the outer circumference of the annular seating surface, in the radial direction of the annular seating surface having its center on the above-indicated axis. However, the lubricant groove may be formed such that a straight line of linear extension of the lubricant groove is inclined with respect to a straight line parallel to the radial direction of the annular seating surface, such that the inner end of the lubricant groove may be located at a circumferential position downstream or upstream of a position lying on the straight line parallel to the radial direction, as seen in the primary direction of rotation of the differential casing. Alternatively, the lubricant groove may be formed along a curved line.

For instance, an annular washer and an annular coned-disc spring are interposed between the annular seating surface of each bearing portion and the back surface of the corresponding side gear. However, only one of the washer and coned-disc spring may be interposed between the annular seating surface and the back surface, and any other member may be interposed therebetween. Alternatively, the back surface of the side gear may be held in direct contact with the annular seating surface, without the washer and coned-disc spring.

The differential casing has a pair of bores which have their centerline on the above-indicated axis and through which rotary shafts connected to the respective side gears are inserted for rotation with the side gears. These bores preferably have spiral grooves formed in their inner circumferential surfaces, so that the lubricant oil outside the differential casing is introduced into the differential casing through the spiral grooves, during rotation of the differential casing relative to the rotary shafts in the primary direction of rotation of the differential casing. However, these spiral grooves need not be provided.

EMBODIMENTS

Preferred embodiments of the present invention will be described in detail by reference to the drawings. It is to be understood that the drawings showing the embodiments are simplified or transformed as needed, and do not necessarily accurately represent dimensions and shapes of various elements of the embodiments.

Figure 1:
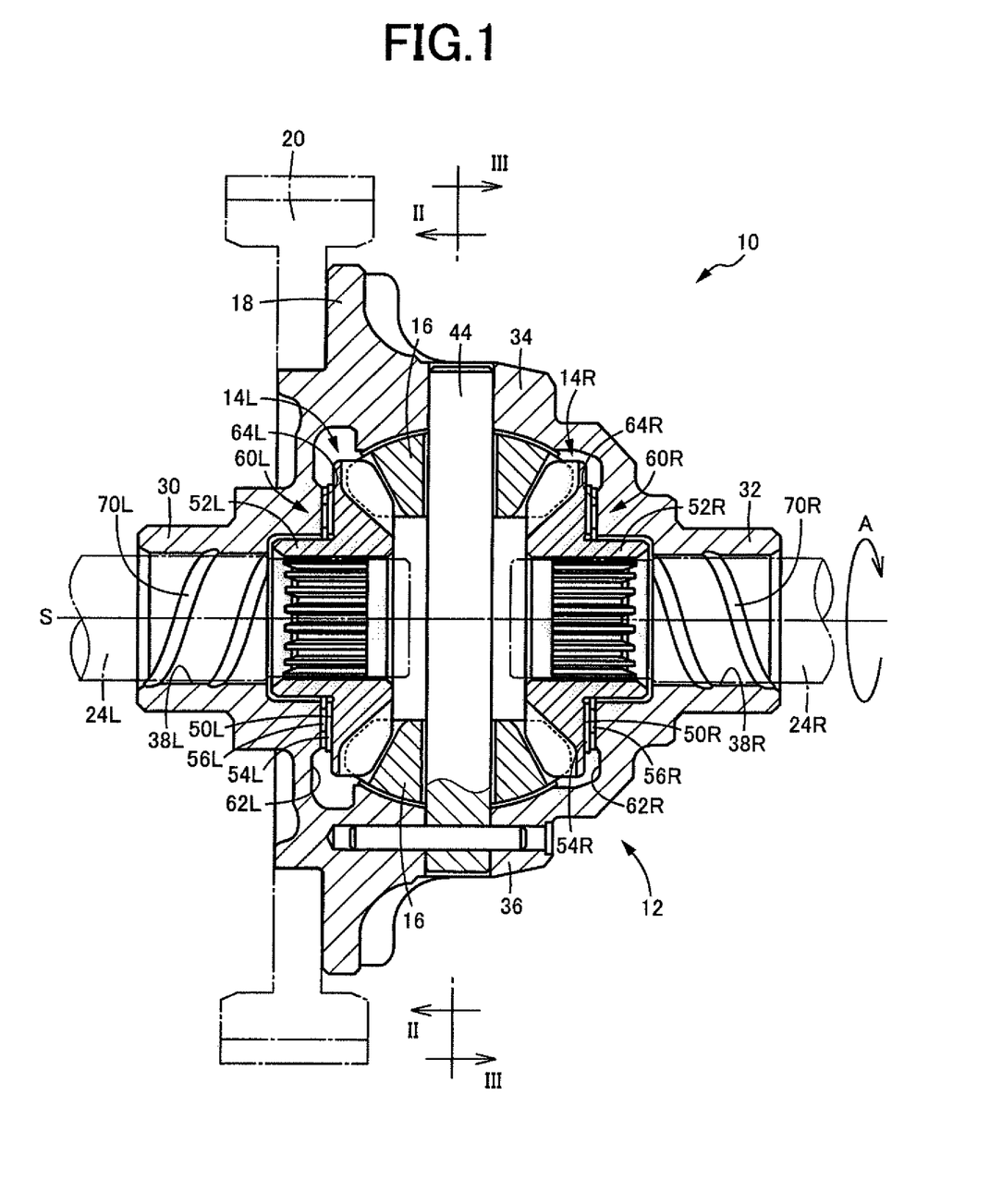
FIG. 1 is a cross sectional view of a differential gear device of a vehicle according to one embodiment of this invention, which is taken in a plane including an axis S.
Figure 2:
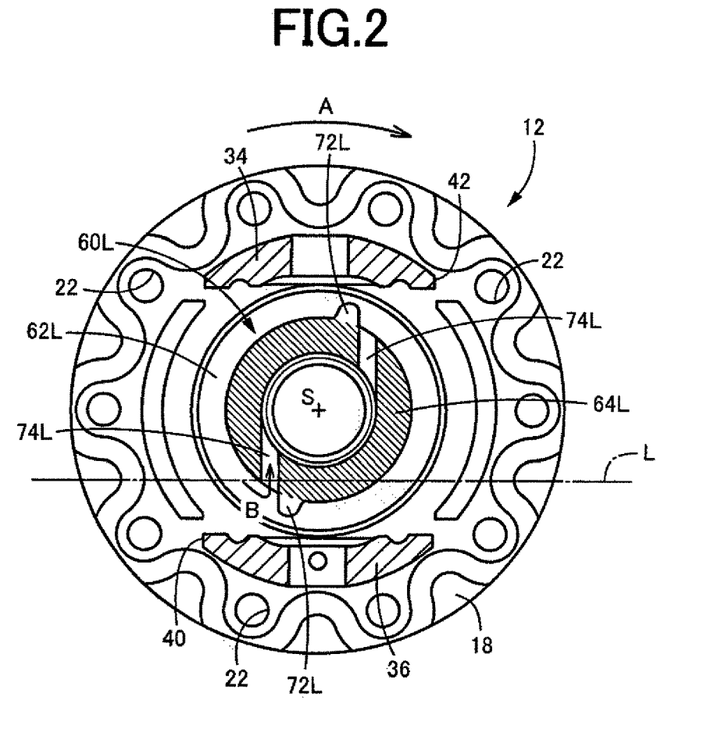
FIG. 2 is a cross sectional view of a differential casing of the differential gear device of FIG. 1, as seen in a direction of arrows II-II of FIG. 1.
Figure 3:
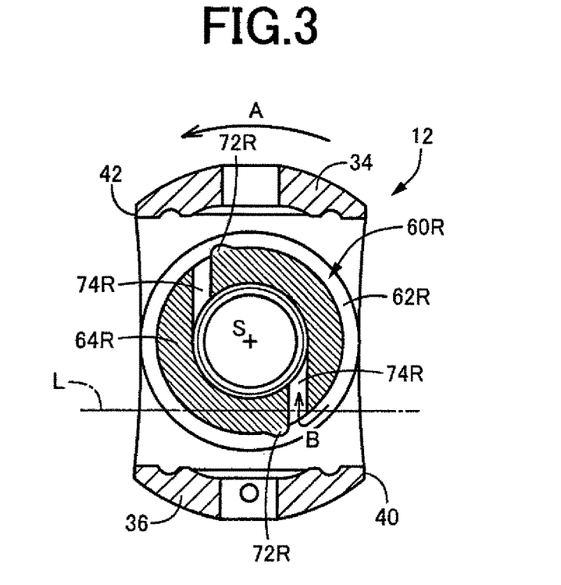
FIG. 3 is a cross sectional view of the differential casing, as seen in a direction of arrows III-III of FIG. 1.
Figure 4:
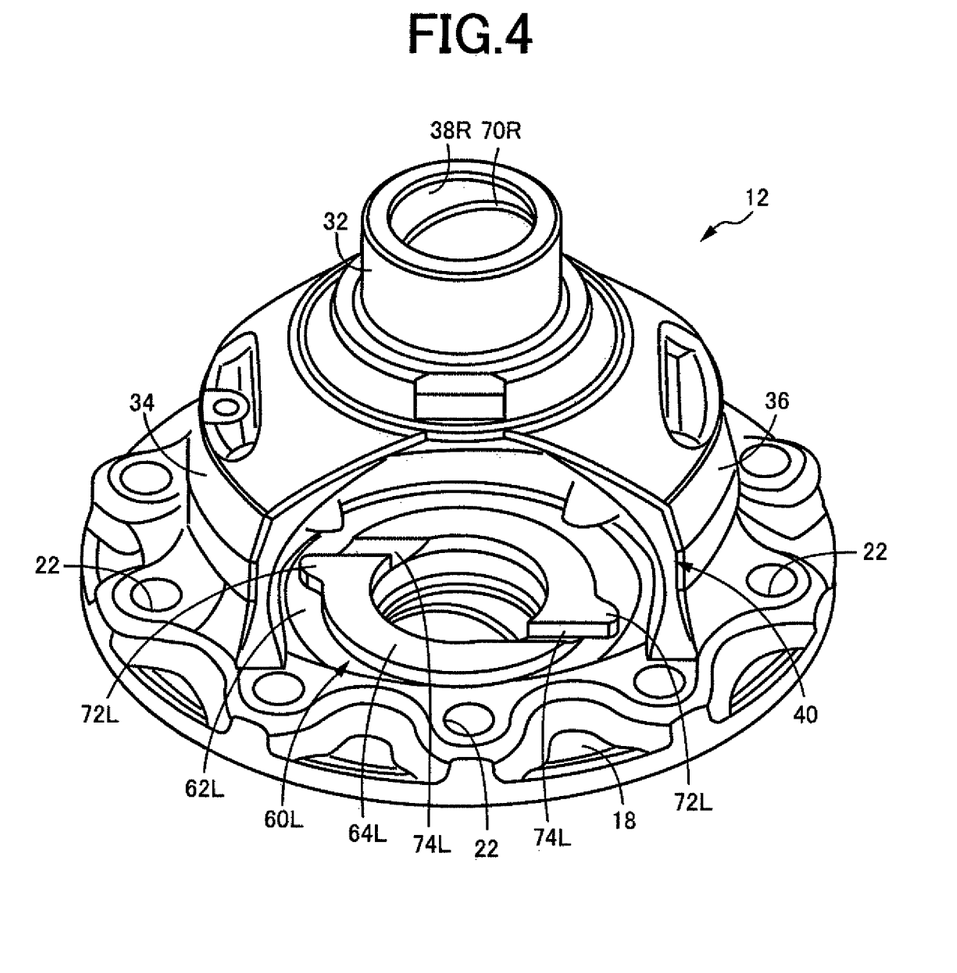
FIG. 4 is a schematic perspective view of the differential casing of the differential gear device of FIG. 1.

Reference is first made to FIG. 1, which is the cross sectional view of a differential gear device 10 constructed according to one embodiment of this invention, which is taken in a plane including an axis S. FIGS. 2-4 are the views showing the differential casing 12 which is a major component of the differential gear device 10. FIG. 2 is the cross sectional view of the differential casing 12, as seen in the direction of arrows II-II of FIG. 1, and FIG. 3 is the cross sectional view of the differential casing 12, as seen in the direction of arrows III-III of FIG. 1, while FIG. 4 is the schematic perspective view of the differential casing 12. For instance, this differential gear device 10 is a differential gear device for a transaxle of a vehicle, which is accommodated within a transaxle casing structure, together with a transmission device. The differential gear device 10 includes the differential casing 12 rotatable about the axis S, and a pair of side gears 14L and 14R which are disposed within the differential casing 12 such that the side gears 14L and 14R are rotatable about the axis S and axially opposed to each other. Further, the differential gear device 10 is configured such that a rotary motion of the differential casing 12 about the axis S is transmitted to the side gears 14L and 14R through two pinion gears 16, so as to permit differential rotary motions of the side gears 14L and 14R. The differential gear device 10 is disposed within the vehicular transaxle casing structure such that the axis S is substantially parallel to the width direction of the vehicle and extends in a substantially horizontal direction. The transaxle casting structure accommodates a lubricant oil such that the differential gear device 10 is partially immersed in the lubricant oil, so that various components are lubricated with the lubricant oil splashed up by rotary motions of the differential casing 12 and other components of the vehicular transaxle.

The differential casing 12 is a one-piece cast structure, for example, and has an integrally formed and outwardly extending flange 18, and is rotated about the axis S with a vehicle drive force transmitted thereto from the transmission device through a differential ring gear 20 fixed to the flange 18 with bolts (not shown). The differential ring gear 20 takes the form of a ring, and functions as an input rotary member of the differential gear device 10. The flange 18 has plurality of (i.e. ten in this embodiment) bolt holes 22 through which the bolts extend to fix the differential ring gear 20 to the differential casing 12. The pair of side gears 14L and 14R are spline-connected to left and right axles 24L and 24R, so that the axles 24L and 24R are rotated together with the side gears 14L and 14R when the differential casing 12 is rotated. The side gears 14L and 14R have center bores the inner circumferential surfaces of which are splined for connection to the axles 24L and 24R. The axles 24L and 24R are output rotary shafts of the differential gear device 10.

The differential casing 12 has a pair of journals 30 and 32 as its opposite end portions as seen in the direction of the axis S, and a pair of connecting portions 34 and 36 connecting the journals 30 and 32 respectively. The differential casing 12 as a whole is a hollow structure disposed within the transaxle casing such that the differential casing 12 is rotatable about the axis S relative to the transaxle casing at its journals 30 and 32. The journals 30 and 32 have respective bores 38L and 38R through which the respective axles 24L and 24R extend. Each of the pair of connecting portions 34 and 36 has a generally arcuate shape having an arcuate outer surface which is curved about the axis S. The two connecting portions 34 and 36 are located symmetrically with each other with respect to the axis S, and cooperate to define a pair of windows 40 and 42 therebetween. These windows 40 and 42 are formed to permit a bevel-gear type differential mechanism, namely, the pair of side gears 14L and 14R and the pair of pinion gears 16 to be installed and assembled together within the differential casing 12. A pinion shaft 44 extends through the two connecting portions 34 and 36, so as to intersect with the axis S. The pair of pinion gears 16 are mounted on the pinion shaft 44 such that the pinion gears 16 are facing each other, are rotatable relative to the pinion shaft 44 and are held in meshing engagement with the pair of side gears 14L and 14R.

The differential casing 12 has a pair of bearing portions 60L and 60R which extend from its respective inner surfaces, toward back surfaces 50L and 50R of the respective side gears 14L and 14R which are opposed to the above-indicated inner surface in the direction of the axis S. The bearing portions 60L and 60R are formed integrally with the differential casing 12, coaxially with the respective side gears 14L and 14R, so as to receive axial loads from the side gears 60L and 60R. The side gears 14L and 14R include respective cylindrical portions 52L and 52R extending in their axial directions opposite to each other and away from each other, such that the cylindrical portions 52L and 52R are located radially inwardly of the respective back surfaces 50L and 50R. The bearing portions 60L and 60R are relatively thick-walled cylindrical portions of the differential casing 12, which are located radially outwardly of the respective cylindrical portions 52L and 52R. The bearing portions 60L and 60R have respective annular seating surfaces 64L and 64R which receive the axial loads from the respective side gears 14L and 14R. The annular seating surfaces 64L and 64R are coaxial with the side gears 14L and 14R and perpendicular to the axis S. Axial dimensions of the two bearing portions 60L and 60R in the direction of the axis S, that is, axial dimensions between the inner surfaces 62L and 62R of the differential casing 12 and the annular seating surfaces 64L and 64R are slightly different from each other, but are both small. While the bearing portions 60L and 60R are tapered portions the outside diameter of which slightly increases in an axial direction from the annular seating surfaces 64L and 64R toward the inner surfaces 62L and 62R, the bearing portions 60L and 60R may be cylindrical portions having a constant outside diameter. Between the seating surfaces 64L and 64R and the back surfaces 50L and 50R, there are interposed respective annular washers 54L and 54R and respective annular coned-disc springs 56L and 56R, such that the washer 54L and the coned-disc spring 56L are superposed on each other while the washer 54R and the coned-disc spring 56R are superposed on each other. Hatched lines of a shorter interval in FIGS. 2 and 3 indicate the annular seating surfaces 64L and 64R of the bearing portions 60L and 60R.

The bores 38L and 38R of the journals 30 and 32 have inner circumferential surfaces each having two spiral grooves 70L, 70R through which the lubricant oil outside the differential casing 12 is introduced into the differential casing 12, during a rotary motion of the differential casing 12 in a primary rotating direction A of rotation relative to the axles 24L and 24R. The differential casing 12 is rotated in the primary rotating direction A when the vehicle is driven in the forward direction. For example, the primary rotating direction A is the clockwise direction as seen in the leftward direction in FIG. 1. In this case, the spiral grooves 70R of the right bore 38R are formed like a left-handed screw, while the spiral grooves 70L of the left bore 38L are formed like a right-handed screw. A portion of the lubricant oil introduced into the differential casing 12 through the spiral grooves 70L and 70R is used to lubricate spline-connecting portions between the side gears 14L and 14R and the axles 24L and 24R. Another portion of the lubricant oil introduced into the differential casing 12 flows through gaps between the differential casing 12 and the side gears 14L and 14R, and is supplied in between the back surfaces 50L and 50R and the annular seating surfaces 64L and 64R, to lubricate the washers 54L and 54R and the coned-disc springs 56L and 56R.

As shown in FIGS. 2-4, each of the bearing portions 60L and 60R has two protrusions 72L, 72R as a form of ribs which extend from an outer circumference of the corresponding annular seating surface 64L, 64R in the radially outward direction of the annular seating surface 64L, 64R. The two protrusions 72L, 72R are located symmetrically with each other with respect to the axis S. The protrusions 72L, 72R have an axial dimension in the direction of the axis S, which is equal to an axial dimension of the corresponding bearing portion 60L, 60R from the corresponding inner surface 62L, 62R to the annular seating surface 64L, 64R which are opposed to the back surface 50L, 50R of the corresponding side gear 14L, 14R. In other words, the protrusions 72L and 72R linearly extend from the corresponding inner surface 62L, 62R toward the corresponding side gear 14L, 14R along the axis S. In the presence of the protrusions 72L and 72R, the lubricant oil accommodated within the differential casing 12 is splashed up by the protrusions 72L and 72R when the protrusions 72L and 72R are immersed in the lubricant oil, that is, moved below an oil level L (indicated in FIG. 2) of the lubricant oil, during a rotary motion of the differential casing 12. The splashed lubricant oil falls down in between the back surfaces 50L and 50R of the side gears 14L and 14R and the annular seating surfaces 64L and 64R of the bearing portions 60L and 60R, so that the washers 54L and 54R and the coned-disc springs 56L and 56R are lubricated with the lubricant oil.

Each of the annular seating surfaces 64L and 64R has two lubricant grooves 74L, 74R formed to extend from its outer circumference to its inner circumference of the annular seating surfaces 64L, 64R such that an outer end of each of the two lubricant grooves 74L, 74R is located downstream of the corresponding one of the two protrusions 72L, 72R as seen in the primary rotating direction A. Straight lines of linear extension of the lubricant grooves 74L, 74R between the outer and inner circumferences of the annular seating surface 64L, 64R are inclined with respect to straight lines parallel to the radial direction of the annular seating surface 64L, 64R having its center on the axis S, such that the inner end of the lubricant groove 74L, 74R is located at a circumferential position downstream of a position lying on the straight line parallel to the radial direction, as seen in the primary rotating direction A. In the present embodiment, the two lubricant grooves 74L, 74R are formed substantially parallel to each other. Each of the lubricant grooves 74L and 74R is substantially Vee-shaped in cross section in a plane perpendicular to the annular seating surface 64L, 64R, and has a depth which decreases in a direction from its outer end on the side of the corresponding protrusion 72L, 72R to its inner end on the side remove from the protrusion 72L, 72R. However, the lubricant grooves 74L and 74R may have any other cross sectional shape determined as needed. In the presence of the lubricant grooves 74L and 74R formed in the annular seating surfaces 64L and 64R and located relatively adjacent to the protrusions 72L, 72R and on the downstream side of the protrusions 72L, 72R as seen in the primary rotating direction A, flows of the lubricant oil are stopped by the protrusions 72L and 72R, and are easily introduced into the lubricant grooves 74L and 74R, as indicated by arrow-headed lines B in FIGS. 2 and 3, so that the lubricant oil is efficiently supplied in between the seating surface 64L, 64R and the back surface 50L, 50R.

As described above, the differential gear device 10 according to the present embodiment of the invention is configured such that each of the pair of bearing portions 60L and 60R of the differential casing 12 has the protrusions 72L, 72R extending from the outer circumference of the corresponding annular seating surface 64L, 64R in the radially outward direction of the annular seating surface 64L, 64R, so that the lubricant oil within the differential casing 12 is effectively splashed up by the protrusions 72L and 72R of the bearing portions 60L and 60R and supplied in between the seating surfaces 64L and 64R and the back surfaces 50L and 50R of the side gears 14L and 14R, even in an early stage of the rotary motion of the differential casing 12. Accordingly, the present differential gear device 10 permits effective splashing of the lubricant oil by the protrusions 72L, 72R during rotation of the differential casing 12, and sufficient lubrication between the back surface 50L, 50R of the side gear 14L, 14R and the seating surface 64L, 64R of the differential casing 12, even on the side of the side gear 14L, 14R which is held stationary in the differential state of the differential gear device 10.

Since the lubricant oil is splashed up by the protrusions 72L and 72R provided on the bearing portions 60L and 60R, the lubricant oil can be efficiently supplied to and around the seating surfaces 64L and 64R, so that a power loss due to the splashing of the lubricant oil can be minimized. Although the amount of supply of the lubricant oil through the spiral grooves 70L and 70R is reduced when the lubricant oil has a low temperature, and a high degree of viscosity and an accordingly low degree of fluidity. However, the splashing of the lubricant oil by the protrusions 72L and 72R permits a sufficient amount of supply of the lubricant oil even at a low temperature of the lubricant oil, and reduces a risk of shortage of supply of the lubricant oil in between the seating surfaces 64L and 64R and the back surfaces 50L and 50R of the side gears 14L, 14R. Further, the power loss due to the splashing of the lubricant oil by the differential ring gear 20 and the other components of the differential gear device 10 can be reduced by lowering the oil level L of the lubricant oil within the differential casing 12, to an extent which permits the protrusions 72L and 72R of the bearing portions 60L and 60R to be immersed in the lubricant oil.

The present embodiment is further configured such that the annular seating surface 64L, 64R of each of the bearing portions 60L and 60R has the two lubricant grooves 74L and 74R formed so as to extend from its outer circumference toward its inner circumference, such that the outer end of the lubricant groove 64L, 64R is located adjacent to the corresponding protrusion 72L, 72R and on the downstream side of the protrusion 72L, 72R as seen in the primary rotating direction A of rotation of the differential casing 12 about the axis S. Accordingly, the flows of the lubricant oil are stopped by the protrusions 72L, 72R and are easily introduced into the lubricant grooves 74L and 74R, so that the lubricant oil is efficiently supplied between the seating surfaces 64L, 64R and the respective back surfaces 50L, 50R of the side gears 14L, 14R.

The present embodiment is also configured such that each of the two lubricant grooves 74L, 74R is formed along the straight line which is inclined with respect to the straight line parallel to the radial direction of the annular seating surface 64L, 64R having its center on the axis S, so that the lubricant oil introduced radially inwardly of the annular seating surface 64L, 64R is brought into contact with wall surfaces of the lubricant grooves 74L, 74R while the inwardly introduced lubricant oil is subjected to a centrifugal force which causes the lubricant oil to be scattered radially outwardly of the annular seating surface 64L, 64R, whereby the radially outward scattering of the lubricant oil is suppressed to permit adequate lubrication of the back surface 50L, 50R of the side gear 14L, 14R and the annular seating surface 64L, 64R.

The present embodiment is further configured such that each of the bearing portions 60L, 60R has the two protrusions 72L, 72R which are spaced apart from each other in the circumferential direction of the corresponding annular seating surface 64L, 64R having its center on the axis S, so that the lubricant oil can be efficiently splashed up by the protrusions 72L, 72R and supplied between the corresponding annular seating surface 64L, 64R and the back surface 50L, 50R of the corresponding side gear 14L, 14R.

The present embodiment is also configured such that the annular washer 54L, 54R and the coned-disc spring 56L, 56R are interposed between the back surface 50L, 50R of each side gear 50L, 50R and the annular seating surface 64L, 64R of the corresponding bearing portion 60L, 60R. Accordingly, the components of the differential gear device 10 have a comparatively large total surface area that should be lubricated with the lubricant oil, so that a comparatively large amount of the lubricant oil is required to be supplied to the components. However, the required amount of the lubricant oil can be supplied to the components, by suitably determining the number, distance of extension and shape of the protrusions 72L and 72R.

The other embodiments of this invention will be described. The same reference signs as used in the first embodiment are used to identify the corresponding components in the following embodiments, which will not be described redundantly.

FIGS. 5-11 are the front elevational views showing different configurations of a bearing portion according to the other embodiments of this invention, which bearing portion is formed integrally with the inner surface 62L of the differential casing 12, to receive an axial load from the side gear 14L. Each of these front elevational views corresponds to that of FIG. 2, and is the elevational view as seen in the direction toward the seating surface 64L. It is noted that the bearing portion on the side of the side gear 14R in the following embodiments will not be described, since this bearing portion is identical and symmetrical with the bearing portion on the side of the side gear 14L similar to FIG. 3.

Figure 5:
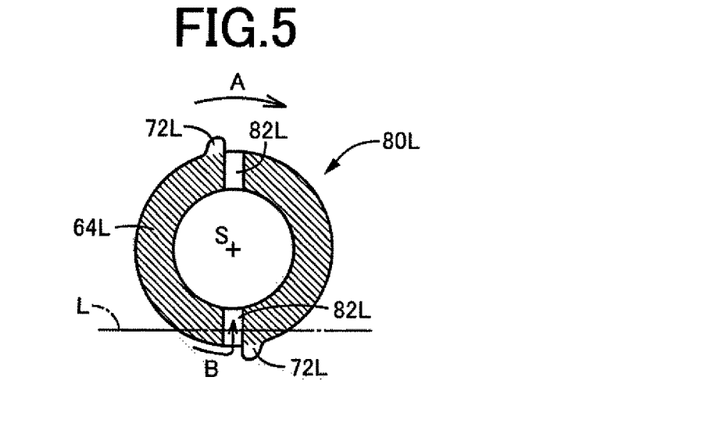
FIG. 5 is a front elevational view of a bearing portion of a differential casing of a differential gear device according to another embodiment of this invention, as seen in a direction toward a seating surface of the bearing portion.
Figure 6:
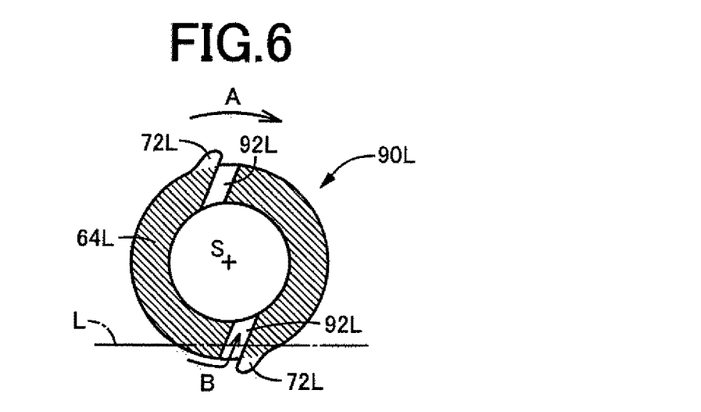
FIG. 6 is a front elevational view of a bearing portion of a differential casing of a differential gear device according to a further embodiment of the invention, as seen in a direction toward a seating surface of the bearing portion.

Unlike the bearing portion 60L according to the first embodiment, the bearing portion 80L according to the second embodiment of FIG. 5 has lubricant grooves 82L each of which is formed so as to extend in the radial direction of the annular seating surface 64L having its center on the axis S, between the outer and inner circumferences of the annular seating surface 64L, and the bearing portion 90L according to the third embodiment of FIG. 6 has lubricant grooves 92L formed such that straight lines of linear extension of the lubricant grooves 92L between the outer and inner circumferences of the annular seating surface 64L, 64R are inclined with respect to straight lines parallel to the radial direction of the annular seating surface 64L, 64R having its center on the axis S, more specifically, such that the inner end of each of the lubricant grooves 74L is located at a circumferential position upstream of a position lying on the straight line parallel to the radial direction, as seen in the primary rotating direction A. In these second and third embodiments, too, flows of the lubricant oil are stopped by the protrusions 72L, and easily introduced into the lubricant grooves 82L, 92L, so that the lubricant oil is efficiently supplied in between the seating surface 64L and the back surface 50L of the side gear 14L. It is particularly noted that in the embodiment of FIG. 6 wherein directions of extension of the protrusions 72L are inclined with respect to the radial direction, the lubricant oil is stopped by the protrusions 72L so as to flow radially inwardly of the annular seating surface 64L, so that the lubricant oil is more efficiently introduced into the lubricant grooves 92L.

Figure 7:
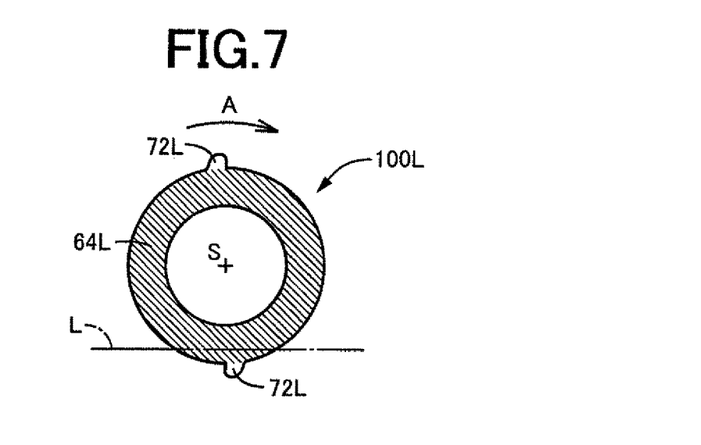
FIG. 7 is a front elevational view of a bearing portion of a differential casing of a differential gear device according to a yet further embodiment of the invention, as seen in a direction toward a seating surface of the bearing portion.

Unlike the bearing portion 60L according to the first embodiment, the bearing portion 100L according to the fourth embodiment of FIG. 7 does not have lubricant grooves 74L formed in its annular seating surface 64L. In this fourth embodiment, too, the lubricant oil is splashed up by the protrusions 72L, and is supplied in between the annular seating surface 64L and the back surface 50L of the side gear 14L.

Figure 8:
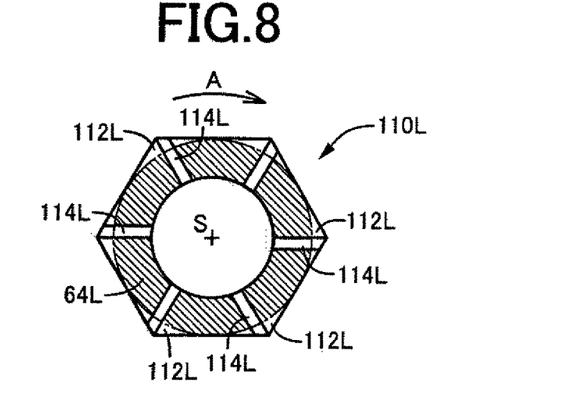
FIG. 8 is a front elevational view of a bearing portion of a differential casing of a differential gear device according to a still further embodiment of the invention, as seen in a direction toward a seating surface of the bearing portion.

The bearing portion 110L according to the fifth embodiment of FIG. 8 has an equilateral hexagonal outer profile, and six protrusions 112L which are formed at respective six apex portions of the hexagonal outer profile. The six protrusions 112L, which extend radially outwardly of the annular seating surface 64L, correspond to the protrusions 72L in the preceding embodiments. Further, the bearing portion 110L has six lubricant grooves 114L which extend from positions located adjacent to and downstream of the apexes of the respective six protrusions 112L in the primary rotating direction A of the differential casing 12. The six lubricant grooves 114L extend from the above-indicated positions to the inner circumference of the annular seating surface 64L, in the radial direction of the annular seating surface 64L, along respective straight lines passing the axis S. In the present fifth embodiment, too, the lubricant oil is splashed up by the protrusions 112L during rotation of the differential casing 12, and the splashed lubricant oil is introduced into the lubricant grooves 114L to permit efficient lubrication between the seating surface 64L and the back surface 50L of the side gear 14L. Thus, the present embodiment has substantially the same advantages as the preceding embodiments.

Figure 9:
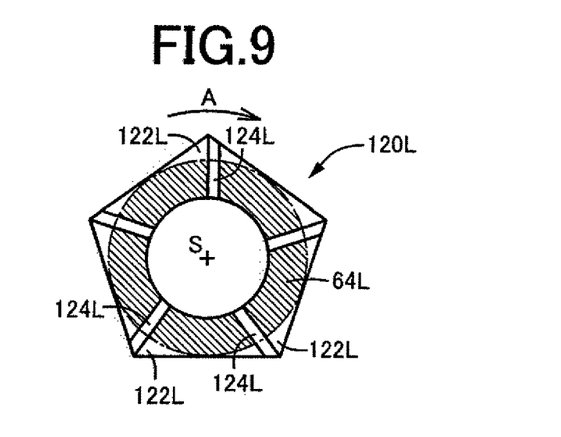
FIG. 9 is a front elevational view of a bearing portion of a differential casing of a differential gear device according to a yet further embodiment of the invention, as seen in a direction toward a seating surface of the bearing portion.

The bearing portion 120L according to the sixth embodiment of FIG. 9 has an equilateral pentagonal outer profile, and five protrusions 122L which are formed at respective five apex portions of the pentagonal outer profile. The five protrusions 122L extend radially outwardly of the annular seating surface 64L. Further, the bearing portion 120L has five lubricant grooves 124L which extend from positions located adjacent to and downstream of the apexes of the respective five protrusions 122L in the primary rotating direction A of the differential casing 12. The five lubricant grooves 124L extend from the above-indicated positions to the inner circumference of the annular seating surface 64L, in the radial direction of the annular seating surface 64L, along respective straight lines passing the axis S. The bearing portion 120L according to this sixth embodiment has substantially the same advantages as the bearing portion 110L according to the fifth embodiment of FIG. 8. In this respect, it is noted that the bearing portion of the differential casing 12 according to this invention may have any other polygonal outer profile such as triangular, square and heptagonal outer profiles.

Figure 10:
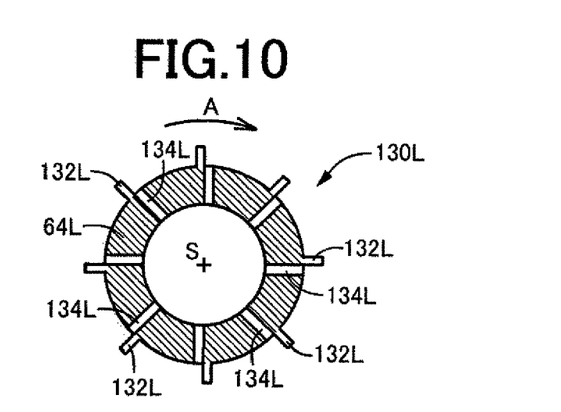
FIG. 10 is a front elevational view of a bearing portion of a differential casing of a differential gear device according to yet another embodiment of the invention, as seen in a direction toward a seating surface of the bearing portion.

The bearing portion 130L according to the seventh embodiment of FIG. 10 has eight protrusions 132L each in the form of a flat plate extending from the outer circumference of the annular seating surface 64L in the radially outward direction. The flat plate, which has parallel opposite surfaces parallel to the axis S, is formed integrally with, or fixed to the bearing portion 130L. The eight protrusions 132L provided to function to splash up the lubricant are equiangularly spaced apart from each other in the circumferential direction of the annular seating surface 64L. Further, the bearing portion 130L has eight lubricant grooves 134L which extend from positions located adjacent to and downstream of the respective eight protrusions 132L in the primary rotating direction A of the differential casing 12. The eight lubricant grooves 134L extend from the above-indicated positions to the inner circumference of the annular seating surface 64L, in the radial direction of the annular seating surface 64L, along respective straight lines passing the axis S. The present seventh embodiment has substantially the same advantages as the preceding embodiments. It is noted that the number of the protrusions 132L may be selected as desired.

Figure 11:
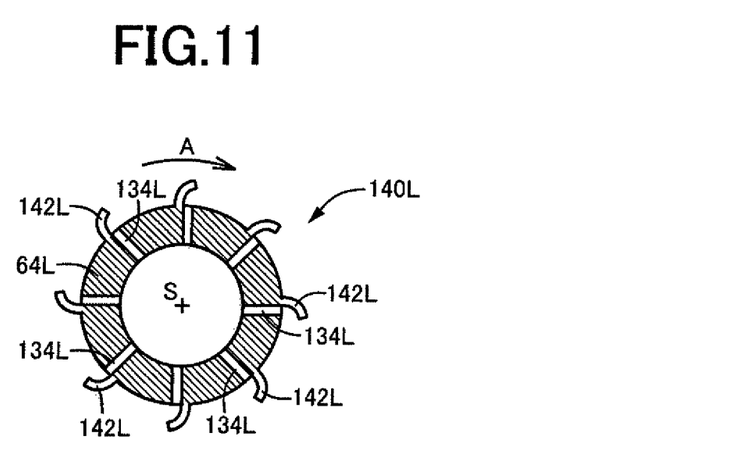
FIG. 11 is a front elevational view of a bearing portion of a differential casing of a differential gear device according to still another further embodiment of the invention, as seen in a direction toward a seating surface of the bearing portion.

The bearing portion 140L according to the eight embodiment of FIG. 11 has eight protrusions 142L. Unlike the protrusions 132L of the bearing portion 130L of FIG. 10, the protrusions 142L are curved in the primary rotating direction A of rotation of the differential casing 12, as the protrusions 142L extend radially outwardly of the annular seating surface 64L. Accordingly, the flows of the lubricant oil are adequately stopped and efficiently splashed up by the protrusions 142L during rotation of the bearing portion 140L together with the differential casing 12 in the primary rotating direction A, and introduced into lubricant grooves 134L formed in the annular seating surface 64L. It is noted that the protrusions 142L may be otherwise shaped, for instance, may extend linearly in directions inclined with respect to the radial direction on the downstream side as seen in the primary rotating direction A.

In the embodiments of FIGS. 8-11, the lubricant grooves 114L, 124L and 134L are formed so as to extend from the outer circumference of the annular seating surface 64L in its radial direction, along straight lines passing the axis S. However, the lubricant grooves 114L, 124L and 134L may be formed along straight lines which are inclined with respect to the straight lines parallel to the radial direction such that the inner ends of the lubricant grooves 114L, 124L and 134L are located at circumferential positions downstream or upstream of the positions lying on the straight lines parallel to the radial direction, as seen in the primary rotating direction A as shown in FIGS. 2 and 6 respectively. Alternatively, the lubricant grooves 114L, 124L and 134L may be eliminated, as in the embodiment of FIG. 7. Further, the bearing portions 110L and 120L of FIGS. 8 and 9 may be provided with additional protrusions like the protrusions 132L or 142L of FIGS. 10 and 11, at the apex portions of the hexagonal or pentagonal outer profile, in addition to the protrusions 112L, 122L.

While the preferred embodiments and modifications have been described for illustrative purpose only, it is to be understood that the present invention may be embodied with various other changes and improvements, which may occur to those skilled in the art.

NOMENCLATURE OF ELEMENTS

10: differential gear device
12: differential casing
14L, 14R: side gears
16: pinion gears
50L, 50R: back surfaces
54L, 54R: washers
56L, 56R: coned-disc springs
60L, 60R, 80L, 90L, 100L, 110L, 120L, 130L, 140L: bearing portions
62L, 62R: inner surfaces
64L, 64R: seating surfaces
72L, 72R, 112L, 122L, 132L, 142L: protrusions
74L, 74R, 82L, 92L, 114L, 124L, 134L: lubricant grooves
S: axis
A: primary rotating direction
L: oil level

What is claimed is:

1. A differential gear device comprising:
a differential casing rotatable about an axis; and
a pair of side gears which are disposed within the differential casing such that the side gears are rotatable about said axis and are axially opposed to each other, and such that a rotary motion of the differential casing about said axis is transmitted to the side gears through at least one pinion gear, so as to permit differential rotary motions of the side gears,
the differential casing having a pair of bearing portions which extend from its respective inner surfaces toward back surfaces of the respective side gears, which are coaxial with said axis and which have respective annular seating surfaces which receive axial loads from the side gears,
and wherein each of the pair of bearing portions has a protrusion extending from an outer circumference of corresponding one of the annular seating surfaces in a radially outward direction of the annular seating surface.

2. The differential gear device according to claim 1, wherein each of the annular seating surfaces of the bearing portions has at least one lubricant groove formed so as to extend from its outer circumference toward its inner circumference such that an outer end of each of the at least one lubricant groove is located adjacent to a corresponding one of the at least one protrusion and on a downstream side of the protrusion as seen in a primary direction of rotation of the differential casing about said axis.

3. The differential gear device according to claim 2, wherein each of the at least one lubricant groove is formed along a straight line which is inclined with respect to a straight line parallel to a radial direction of the corresponding annular seating surface having its center on said axis.

4. The differential gear device according to claim 1, wherein the at least one protrusion consists of a plurality of protrusions which are spaced apart from each other in a circumferential direction of the corresponding annular seating surface having its center on said axis.

5. The differential gear device according to claim 1, wherein a washer and a coned-disc spring are interposed between the back surface of each of the pair of side gears and the annular seating surface of a corresponding one of the pair of bearing portions.

6. The differential gear device according to claim 1, which is disposed such that said axis extends in a substantially horizontal direction and such that the at least one protrusion is immersed in a lubricant oil accommodated within the differential casing, to permit the at least one protrusion to splash up the lubricant oil during the rotary motion of the differential casing.

* * * * *